Figure 1:
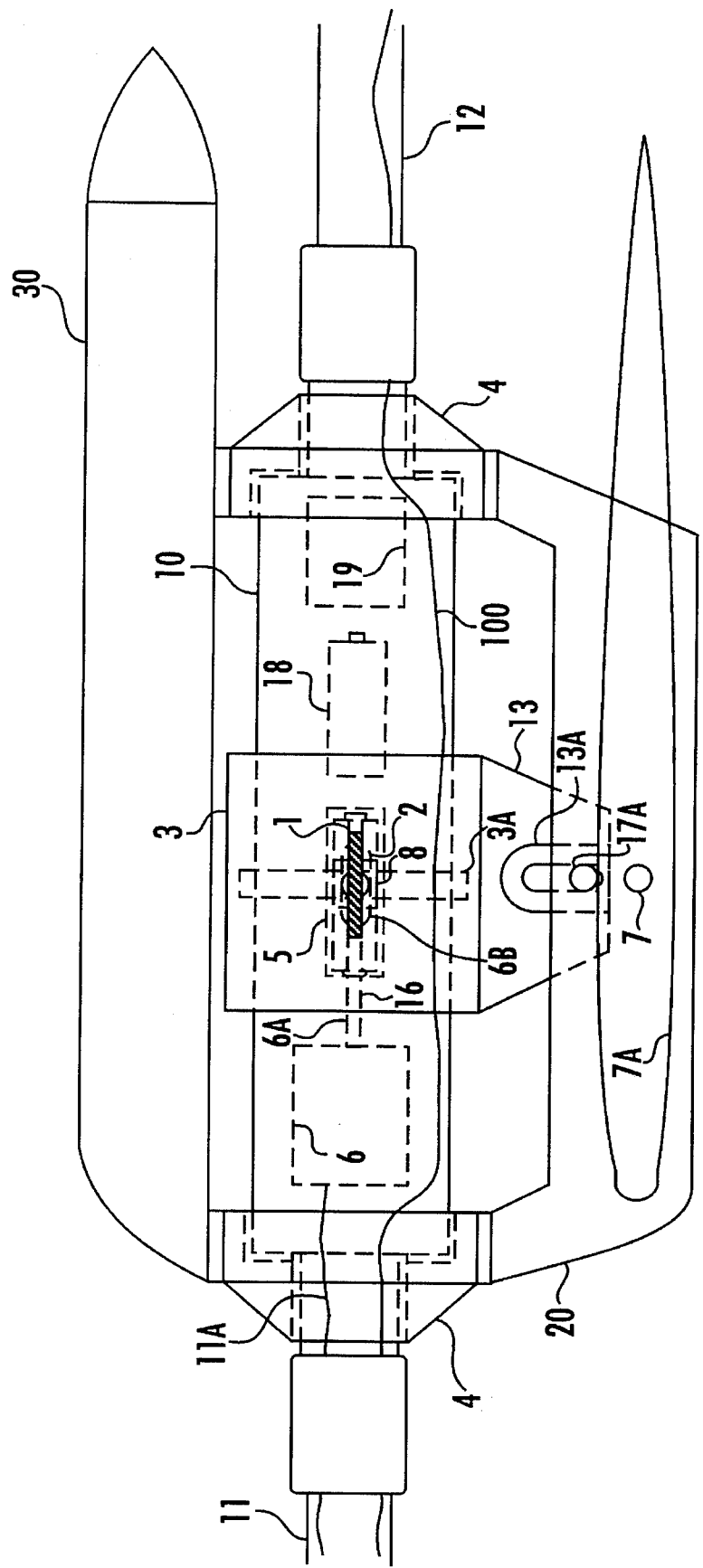

US005619474A

United States Patent [19]
Kuche

[11] Patent Number: 5,619,474
[45] Date of Patent: Apr. 8, 1997

[54] DEPTH CONTROL APPARATUS

[75] Inventor: Hans-Walter Kuche, Sprockhövel, Germany

[73] Assignee: Petroleum Geo-Services A/S, Lysaker, Norway

[21] Appl. No.: 438,632

[22] Filed: May 10, 1995

[30] Foreign Application Priority Data

May 13, 1994 [NO] Norway ...................................... 941801

[51] Int. Cl.$^6$ ................................ G01V 1/38; B63G 8/14
[52] U.S. Cl. ................................ 367/17; 367/16; 114/245; 114/332
[58] Field of Search ........................ 367/16, 17; 114/331, 114/332, 245

[56] References Cited

U.S. PATENT DOCUMENTS

| 3,490,124 | 1/1970 | Miller | 29/191 |
|---|---|---|---|
| 3,531,761 | 9/1970 | Tickell et al. | 340/7 |
| 3,531,762 | 9/1970 | Tickell | 340/7 |
| 3,931,608 | 1/1976 | Cole | 340/7 |
| 3,943,483 | 3/1976 | Strange | 340/7 |
| 3,961,303 | 6/1976 | Paitson | 340/7 |
| 4,711,194 | 12/1987 | Fowler | 114/245 |
| 4,928,262 | 5/1990 | Neeley et al. | 367/16 |

Primary Examiner—Nelson Moskowitz
Attorney, Agent, or Firm—Gordon T. Arnold

[57] ABSTRACT

A depth control apparatus for seismic streamers, comprising a central unit adapted for inserted mounting in the streamer substantially in axial alignment with the streamer, a housing which can rotate about the central unit and carries at least one control wing being angularly adjustable about a transverse axis adapted to be substantially horizontal in operative position, and an electric motor for adjusting the angle of the control wing about the transverse axis. The motor is located in the central unit and is adapted to have its current supply through the streamer. The control wing is so arranged on the housing that the transverse axis in operative position runs underneath the central unit. A transmission mechanism for the angular adjustment of the control wing by means of the motor, comprises a slide member which can be moved in the axial direction of the central unit and preferably surrounds the central unit.

12 Claims, 3 Drawing Sheets

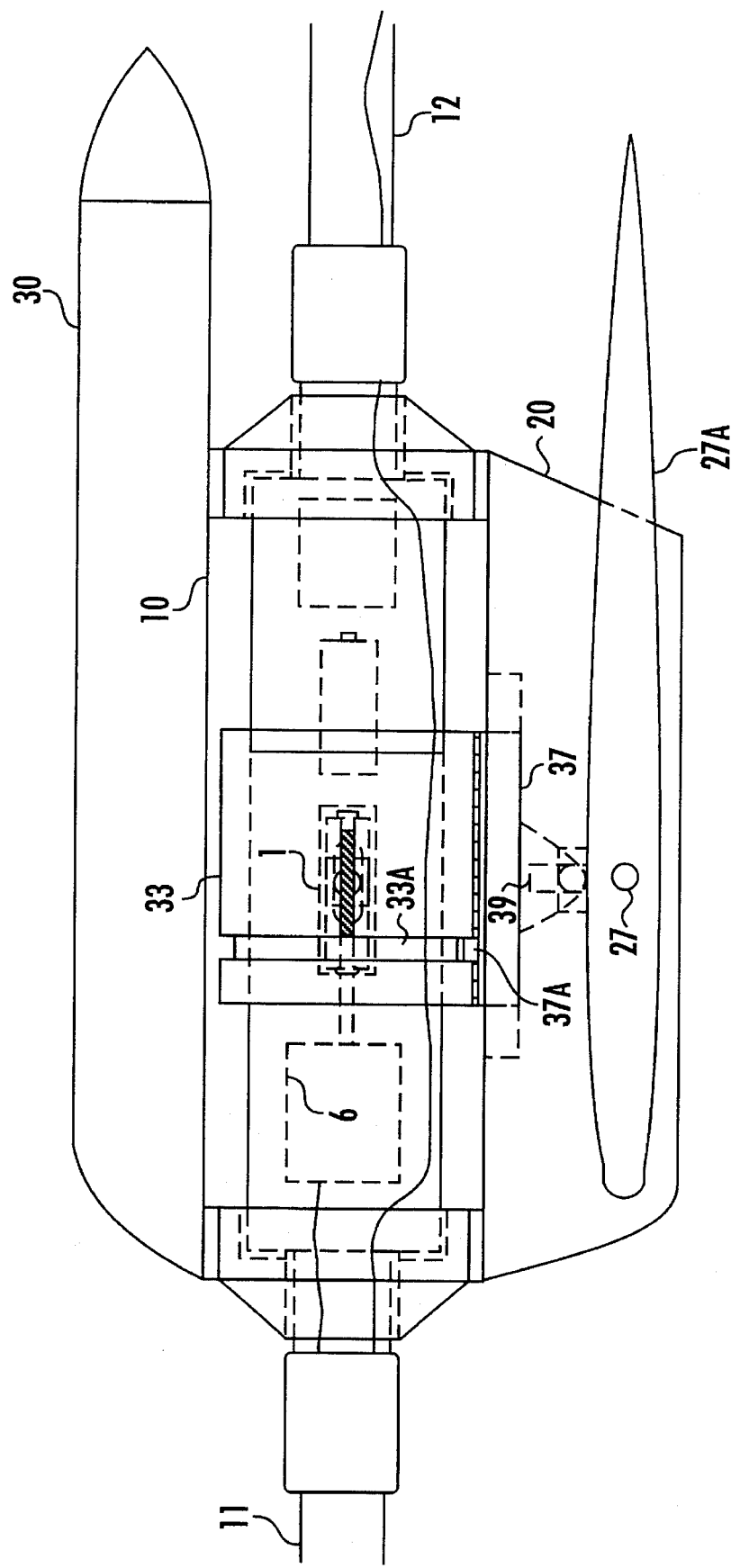

DEPTH CONTROL APPARATUS

This invention relates to a depth control apparatus for seismic streamers, comprising a central unit adapted for inserted mounting in the streamer substantially in axial alinement with the streamer, a housing which can rotate about the central unit and carries at least one control wing being angularly adjustable about a transverse axis adapted to be substantially horizontal in operative position, and an electric motor for adjusting the angle of the control wing(s) about the transverse axis.

In marine seismic exploration a vessel tows acoustic sources, usually airguns, and one or usually several hydrophone or receiver cables (streamers). For various reasons it is important that both sources and receivers (hydrophones) are positioned at an exactly predetermined depth underneath the sea surface. As far as the sources are concerned this is no big problem. With respect to the streamer or streamers however, this is a much more difficult task. During towing the streamer shall not at any point deviate more than about 1 meter from the desired depth, which is usually about 8 meters. As known there is a requirement for an active depth control that automatically brings the streamer back to the desired depth when deviation therefrom occurs. Such deviation can be due to currents, variations of temperature or salinity in the water or variation of the speed of the towing vessel. In order to accomplish this, there are mounted depth control devices (so called "birds") at intervals of normally 200 meters along the streamer.

In known designs the control wing or wings is arranged symmetrically outwards to either side in relation to the streamer, and serves to steer the streamer upwards or downwards in the water to the depth desired, upon a command from a towing or master vessel, or the depth control apparatus can be adapted for automatically keeping the streamer at a predetermined depth. The electric motor for angular adjustment of the control wing has its power supply from batteries located in or on the apparatus, and communication with the vessel takes place by means of an inductive coupling between a coil in the depth control apparatus and a coil in the streamer. A magnetic compass is usually integrated into the system. Along a streamer of length e.g. 3 kilometers there can normally be mounted 14–16 depth control devices of this kind.

More particularly from Norwegian patent 169.922 there is known a device adapted to be attached to streamers, comprising a central module incorporated in the streamer, namely between two streamer sections and a rotatable housing surrounding this module as stated above. In this known design the housing has an exterior, detachable part containing in the first place batteries for power supply, electronic circuits and important mechanical components, such as the drive motor itself. In the housing or the central module there are provided coils for making possible inductive communication between the mutually rotatable components, so that the desired depth at any time may be changed upon command from the towing vessel. This Norwegian patent specification can be considered representative of the closest known techniques with respect to depth control devices for seismic streamers.

Although known and common devices as discussed above may have a satisfactory function in many respects, they have some apparent drawbacks. For the current supply there are usually employed lithium batteries which are very expensive, and transport thereof is subject to very severe restrictions. In a streamer in regular operation batteries have to be replaced approximately once each month, involving quite high expenditures for each depth control apparatus or unit. In addition to the actual battery expenditures the loss of operational or production time during retraction and deployment of the streamers should be taken into account.

Another serious problem during seismic operations consists therein that from time to time the streamers will come into conflict or collide with objects in the sea, e.g. fishing gear or other obstacles, which often lead to the disruption or loss of depth control units or parts thereof. This represents other additional costs, since there is here the question of units costing each several tens of thousands NOK. Substantial improvements with respect, inter alia, to the drawbacks and problems mentioned above, are obtained according to the invention in a depth control apparatus as stated in the introduction above, thereby that the motor is located in the central unit and is adapted to have its current supply through the streamer, that the control wing(s) is so arranged on the housing that the transverse axis in operative position runs underneath the central unit, and that a transmission mechanism for the angular adjustment of the control wing(s) by means of the motor, comprises a slide member which can be moved in the axial direction of the central unit and preferably surrounds the central unit.

With this new solution the essential and more expensive components are built into the central unit or module that is inserted in the actual streamer at desired positions. Thus more particularly, the central unit contains the electric motor and preferably electronic circuits being required, a depth sensor and possibly a compass as well as backup batteries which shall be able to supply a sufficient amount of current during short periods in the case of interruption of the current supply through the streamer. The backup batteries can be of a usual rechargeable type. Normally however, the current supply will take place through the streamer.

With the arrangement set forth here the essential components of the depth control apparatus will not be located outside or project to any significant degree outwards in relation to the generally smooth surface of the streamer, so that only less expensive mechanical parts will be lost in the case of collisions and the like as discussed above. In this connection it is essential that the motor in the central unit receives its current supply through the streamer, which leads to a very secure and reliable control function that normally is dependent on current from batteries as well as complicated and vulnerable couplings between the rotatable housing and the central unit.

As will appear from the following description the moveable slide member in the transmission mechanism between motor and control wing(s) can be rotatable together with the housing in relation to the central unit, or this slide member can be rotationally coupled to the central unit. In both cases the slide member is preferably so arranged that it surrounds or encloses the central unit completely or partially around the circumference thereof, but has an axial extension that may amount to a fraction of the total length of the central unit. In the following more thorough explanation of the apparatus according to the invention with reference to an exemplary embodiment shown in the drawing, additional advantages as well as novel and specific features will be apparent.

Figure 2:
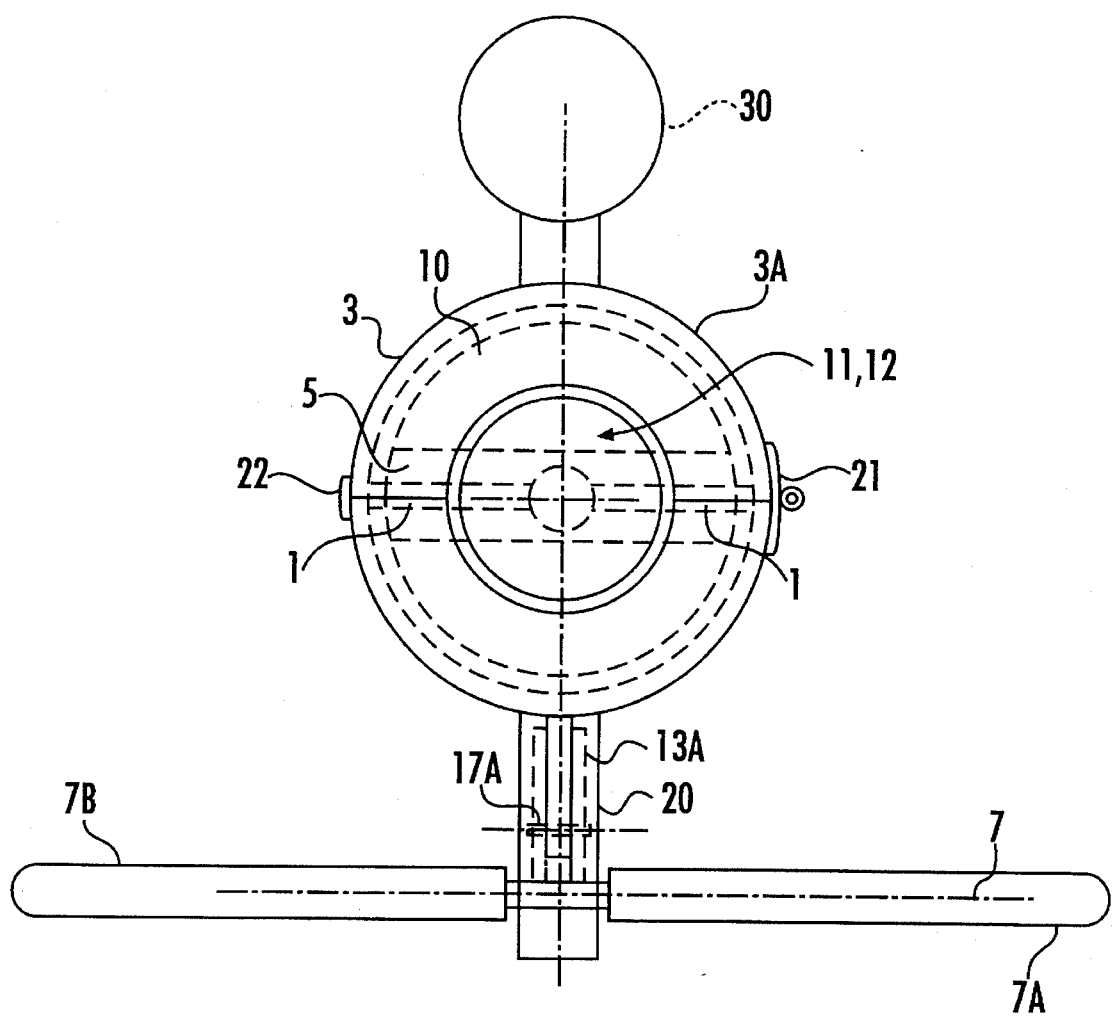

FIG. 1 in a simplified elevation and partial longitudinal sectional view, shows the depth control apparatus according to the invention, FIG. 2 shows the apparatus of FIG. 1 in end view and partial cross section, and FIG. 3 shows a similar elevational view as in FIG. 1, of another embodiment according to the invention.

On either side of the apparatus in FIG. 1 there are shown end portions 11 and 12 of streamer sections between which the depth control apparatus is inserted. The continuity of the streamer is maintained primarily by means of a central unit or module 10 which e.g. by thread connections is attached to the respective streamer sections 11 and 12. Thus the central unit 10 will also participate in possible rotational movements of the streamer about its longitudinal axis.

By means of mounting rings 4 or the like at each end of the central unit 12 there is arranged a housing 20 which by the way of a rotatable arrangement of the mounting rings 4 on the central unit 10, is rotatable about the central unit. As will also appear from FIG. 2 housing 20 to some extent can be regarded as a bracket carrying control wings 7A and 7B that are angularly adjustable for depth control of the streamer 11, 12 during towing thereof through the water. In this embodiment the wings 7A, 7B can rotate about an axis 7 that in the operative position of the apparatus is located at a distance underneath the central unit 10 and runs transversally in relation to the longitudinal axis thereof and the streamer 11, 12 as a whole. Thus during operation the depth control apparatus normally will have the vertical orientation as seen in the figures of drawings, namely with the bracketlike housing 20 directed in general vertically downwards from the central unit 10.

To a substantial degree this orientation is provided for by a float member 30 being arranged in the form of a separate component on the upper side in relation to housing 20, and like this being attached by means of the mounting rings 4 mentioned, so as to be rotatable with respect to the central unit 10. With this design the float 30 can have a sufficient size, but can at the same time constitute a separate and relatively inexpensive component that will not represent any serious loss in the case of a collision with an object in the water.

In the central unit 10 there is schematically shown an electric motor 6 receiving its current supply through the streamer section 11 as indicated at 11A. In addition to motor 6 there are shown in central unit 10 and also in a simplified manner, a backup battery 18 and a compass 19.

Of substantial significance for a reliable and correct steering or control function, is the provision of the transmission mechanism between the output axle 6A of the motor and the wings 7A,7B for the angular adjustment thereof about axis 7. Preferably centrally in unit 10 there is provided in this connection a chamber 5 which is sealed in a watertight manner from the interior of the remaining central unit 10, and which as a watertight seal 16 for the motor axle 6A in an end wall 14. Consequently the chamber 5 can be without any seal against the ambient water, which to a high degree contributes to making possible a practical and reliable transmission of the rotational movement from motor axle 6A to a desired angular adjustment of wings 7A and 7B.

In this embodiment the axle 6A within chamber 5 is provided with a threaded portion 6B being in engagement with an axially displaceable guide member 8 having a transverse guide pin 1. The pin 1 projects laterally out of the central unit 10 and the chamber 5 to either side through a longitudinal slit 2 and further cooperates with an outer slide member which can freely rotate about the central unit 10. For this purpose the slide member 3 is provided with an interior groove 3A the width of which corresponds to the diameter of guide pin 1. Suitably groove 3A can extend around the whole interior circumference of slide member 3. Moreover this member is displaceable in the axial direction outside a portion of the central unit 10, whereby such an axial displacement or movement apparently can be brought about by the motor rotating the axle 6A.

For the further transmission of the movement the slide member 3 has a plate shaped actuator element 13 adapted to project downwards so as to cooperate with a transverse pin 17A at the end of an arm 17 the opposite end of which is rigidly connected to the wing axle 7. Actuator element 13 has a groove 13A for pin 17A, so that the angular position of wings 7A, 7B will be changed upon axial displacement of slide member 3. In other words rotation of motor axle 6A in such a direction that guide pin 1 is moved forwardly, i.e. to the left in FIG. 1, will lead to an angular movement of wings 7A, 7B to a more downwardly directed position, thus with a steering effect causing the streamer 11, 12 to run deeper in the water.

As indicated above alternative embodiments may be contemplatet, at least with respect to parts of the transmission mechanism described. This in particular applies to slide member 3, which can also be arranged with a rotational coupling to central unit 10. This is illustrated in FIG. 3, where the other main components correspond to the those found in FIG. 1. However, instead of the interior groove 3A in the slide member, FIG. 3 shows a slide member 33 provided with an external groove 33A around the whole circumference. A guide or notch element 37A on an axially displaceable member 37 engages the external groove 33A in order thereby to bring about an angular movement of the wing 37A by an axial displacement of slide member 33. As in the embodiment of FIG. 1, the one in FIG. 3 has an axle 27 for the angular adjustment of wing 27A. For the transmission of movements between the displaceable member 37 and wing 27A, there is shown a mechanism 39 corresponding broadly to the elements 13A and 17A in FIG. 1.

An example of a structure for the clamping attachment of the mounting rings 4 and possibly the slide member 3 externally of central unit 10 (see FIG. 1), is shown in FIG. 2 in the form of a hinge 21 and diametrically opposed thereto a lock device 22.

As schematically indicated at 100, there may be provided through the whole longitudinal direction of central unit 10 one or more passages for electrical wires etc. running through the streamer sections 11 and 12.

The complete depth control apparatus as illustrated in FIGS. 1, 2 and 3 similar to the streamer as a whole, preferably has a neutral buoyancy in water, but as a result of the weight distribution in housing 20 and the erecting force caused by the float 30, the apparatus during operation will assume a generally vertical orientation as illustrated in the drawing.

In the embodiment shown there are provided mounting rings 4 at both ends of the central unit 10, but there may also be contemplated a modified variant comprising only one such mounting ring, e.g. at the forward end of the central unit. In such case it may be possible to establish another supporting or attachment point for the overhead float, possibly also for the housing below, by providing the slide member with guide elements in cooperation with the float and the housing respectively.

Also other modifications can be made in relation to the exemplary embodiment being shown and described with reference to the drawing.

I claim:

1. A depth control apparatus for use with a seismic streamer, comprising a central unit adapted for inserted mounting in the streamer substantially in axial alignment with the streamer, a housing having a longitudinal first axis which can rotate about the central unit and carries at least one control wing being angularly adjustable about a second axis transverse to the longitudinal axis of the housing adapted to be substantially horizontal in operative position, and an electric motor for adjusting the angle of the control wing about the second axis, wherein the motor is located in the central unit and is adapted to have its current supply through the streamer, the control wing is so arranged on the housing that the second axis in operative position runs underneath the central unit, and a transmission mechanism for the angular adjustment of the control wing by means of the motor, wherein the transmission mechanism comprises a slide member which is positioned and arranged for movement in the axial direction of the central unit and substantially surrounding the central unit.

2. An apparatus according to claim 1, further comprising a backup battery for temporary current supply to the motor in the case of interruption in the current supply through the steamer, wherein the backup battery is positioned in a backup battery location within the central unit.

3. An apparatus according to claim 2 further comprising a compass in the central unit.

4. An apparatus as in claim 3 further comprising a float member rotatably connected to the central unit and adapted to be above the central unit in operative position.

5. An apparatus as in claim 3 further comprising a chamber in the central unit sealed in a watertight manner from remaining interior of the central unit and adapted to receive water from the outside, wherein a part of the transmission mechanism is located in the chamber and a drive axle from the motor passes through a watertight seal in a wall which delimits the chamber.

6. An apparatus as in claim 2 further comprising a float member rotatably connected to the central unit and adapted to be above the central unit in operative position.

7. An apparatus as in claim 6 further comprising a chamber in the central unit sealed in a watertight manner from remaining interior of the central unit and adapted to receive water from the outside, wherein a pan of the transmission mechanism is located in the chamber and a drive axle from the motor passes through a watertight seal in a wall which delimits the chamber.

8. An apparatus as in claim 1 further comprising a compass in the central unit.

9. An apparatus as in claim 7 further comprising a chamber in the central unit sealed in a watertight manner from remaining interior of the central unit and adapted to receive water from the outside, wherein a part of the transmission mechanism is located in the chamber and a drive axle from the motor passes through a watertight seal in a wall which delimits the chamber.

10. An apparatus as in claim 1 further comprising a float member rotatably connected to the central unit and adapted to be above the central unit in operative position.

11. An apparatus as in claim 10 further comprising a chamber in the central unit sealed in a watertight manner from remaining interior of the central unit and adapted to receive water from the outside, wherein a part of the transmission mechanism is located in the chamber and a drive axle from the motor passes through a watertight seal in a wall which delimits the chamber.

12. An apparatus as in claim 1 further comprising a chamber in the central unit sealed in a watertight manner from remaining interior of the central unit and adapted to receive water from the outside, wherein a part of the transmission mechanism is located in the chamber and a drive axle from the motor passes through a watertight seal in a wall which delimits the chamber.

\* \* \* \* \*